(12) United States Patent
Yamauchi et al.

(10) Patent No.: US 6,204,868 B1
(45) Date of Patent: Mar. 20, 2001

(54) IMAGE FORMING APPARATUS PROVIDING POLYGONAL MIRROR HAVING BRAKING MEANS

(75) Inventors: Kazumichi Yamauchi; Hiroshi Kobayashi, both of Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/116,797

(22) Filed: Jul. 16, 1998

(30) Foreign Application Priority Data

Jul. 22, 1997 (JP) .................................................... 9-195583

(51) Int. Cl.[7] ............................. B41J 2/385; G03G 13/04
(52) U.S. Cl. ........................................... 347/129; 347/261
(58) Field of Search ..................................... 318/362, 375, 318/376; 347/129, 247, 260, 261; 359/198, 200, 216, 217

(56) References Cited

U.S. PATENT DOCUMENTS

| | | | |
|---|---|---|---|
| 4,578,689 | * | 3/1986 | Spencer et al. ...................... 347/129 |
| 5,512,927 | * | 4/1996 | Okamoto .............................. 347/129 |
| 5,589,871 | * | 12/1996 | Aoki et al. ............................ 347/247 |
| 5,900,903 | * | 4/1999 | Fukita ................................. 347/260 |
| 5,946,122 | * | 8/1999 | Itoh et al. ............................ 359/200 |
| 5,995,130 | * | 11/1999 | Akatsu et al. ....................... 347/254 |

* cited by examiner

Primary Examiner—Sandra Brase
(74) Attorney, Agent, or Firm—Frishauf, Holtz, Goodman, Langer & Chick, P.C.

(57) ABSTRACT

In an image forming apparatus in which an exposure is conducted by scanning of a laser beam, the apparatus includes a photoreceptor for forming a latent image thereon; an exposure device having a rotary polygonal mirror for exposing the photoreceptor, wherein the laser beam is deflected and scanned onto the photoreceptor by rotating the rotary polygonal mirror; a controller for controlling a linear speed of the photoreceptor; and a braking device for decreasing forcibly a speed of rotation of the polygonal mirror. When the controller decreases the linear speed of the photoreceptor according to an image formation mode, the braking device decreases the speed of rotation of the polygonal mirror.

11 Claims, 7 Drawing Sheets

IMAGE FORMING APPARATUS PROVIDING POLYGONAL MIRROR HAVING BRAKING MEANS

BACKGROUND OF THE INVENTION

The present invention relates to an image forming apparatus such as digital copiers, laser printers, and the like in which image recording is carried out by scanning the surface of a photoreceptor employing laser beams.

In electrophotographic digital copiers, etc., technology is widely employed in which an electrostatic latent image is written on the surface of a photoreceptor drum, etc., while deflecting laser beams employing a polygonal mirror. The photoreceptor drum of a copier is rotated so that the line speed matches to the conveyance speed of a recording sheet. In digital copiers, the speed of rotation of the polygonal mirror is fixed in accordance with the rotational speed of the photoreceptor drum and pixel-recording density.

Furthermore, when the polygonal mirror is stably rotated at high speed, recording speed and image quality of the digital copier are improved. Accordingly, technology is known in which the rotation shaft is integrated with the polygonal mirror; further, an air bearing, which is one kind of dynamic pressure bearings, is employed on the rotation shaft so as to avoid direct contact of members of the rotation shaft and the bearing each other, allowing the polygonal mirror to be stably rotated at high speed.

Now, because automation and diversification are required to meet requirements for recording sheet output, digital copiers have been increasingly demanded which enable the presentation of a variety of image-processing functions. However, at present, no digital copiers provide the image forming mode in which the speed of rotation of the polygonal mirror is varied.

For example, in analog copiers, when copying is carried out employing thick paper sheets, image forming operation is carried out by decreasing the line speed in order to obtain high quality images. However, in digital copiers, when the line speed is changed, variation in the speed of rotation of the polygonal mirror is required. Accordingly, it has been extremely difficult to provide the image forming mode which outputs good images to thick paper sheets.

The following apparatus has been known in which an electrophotographic image forming apparatus is subjected to mere variation of the speed of rotation of the polygonal mirror. In recent years, an electrophotographic apparatus has been introduced which is employed as a digital copier and a laser printer in one unit. This apparatus is termed a composite apparatus. In such composite apparatuses, the line speed is varied when employed as a digital copier and when employed as a laser printer, and thus the speed of rotation of the polygonal mirror is altered.

Generally, a polygonal mirror is very light and friction caused on the bearings is very small. In an image forming apparatus which is constituted in such a way that the decrease in the rotational speed of the polygonal mirror, which continues to rotate due to inertia is waited, the time until the rotational speed of the polygonal mirror decreases to the predetermined level can be quite long. Particularly, in a high speed apparatus which results in high productivity of image output, a decrease in friction is achieved employing air bearings so as to be in no contact of the polygonal mirror with the portion of the driving source. Accordingly, when the natural decrease in the speed of rotation of the polygonal mirror is waited, the waiting time becomes very long compared with the bearing in which the polygonal mirror is in contact with the portion of the driving source and, for example, several tens of seconds are required for the subsequent image formation. Thick paper sheets may be employed in cases, for example, when a cover is prepared employing a copied sheet of thick paper for copied sheets of normal paper or copied sheets of thick paper are employed as partition sheets and are bound, employing a finisher. In this case, switching from normal paper to thick paper is complicated. If switching from normal paper to thick paper takes several tens of seconds, a long time is required to complete continuous copying operations which decrease the imaging productivity. In addition, when employed upon switching the resolution, during switching, the speed of rotation of the polygonal mirror is occasionally decreased and the waiting time becomes longer.

SUMMARY OF THE INVENTION

An object of the present invention is to decrease a waiting time, in which during the image-writing operation, in the case of varying the speed of rotation of the polygonal mirror in accordance with the variation of the line speed of a photoreceptor, the speed of rotation of the polygonal mirror is reduced in a short period of time.

Furthermore, another object is to improve the image output productivity in the case of performing a series of image forming operations to obtain a plurality of output images onto different kinds of sheets.

Furthermore, the polygonal mirror is light in weight, and rotates at high speed. When a brake shoe, lubricating oil, dust, etc. attach or adhere to it as attached or adhered matter, the rotation balance is not sustained and possibly, normal image formation may not be carried out.

Accordingly, still another object of the present invention is to eliminate the adhesion of foreign matter to the polygonal mirror or rotation shaft, which results in a braking action to decrease the speed of rotation of the polygonal mirror upon increasing the output productivity by shortening the switching time for image formation.

Furthermore, when the speed of rotation of the polygonal mirror is forcibly decreased in a short time instead of decreasing the frequency as the mirror rotates, there may be a period when the rotation of the polygonal mirror is not stabilized. When the image formation is performed during such a period, the image quality may be remarkably deteriorated.

A further object of the present invention is to perform image formation so as to obtain excellent image quality, even though the speed of rotation of a polygonal mirror is forcibly decreased.

The above-mentioned objectives are accomplished by any one of constitutions mentioned below.

(1) An image forming apparatus in which exposure is carried out employing laser beam scanning comprises the following constitutions:
   a photoreceptor carrying a latent image;
   an exposure means comprising a polygonal mirror by rotating this polygonal mirror, laser beam is deflected so as to scan the above-mentioned photoreceptor;
   a means to control the linear speed of the photoreceptor in accordance with the image forming mode;
   a braking means to decrease forcibly the speed of rotation of the polygonal mirror, wherein when the line speed of the photoreceptor is herein decreased employing the above-mentioned control means, the above-mentioned braking means decreases the speed of rotation of the polygonal mirror.

(2) laser scanning device in which exposure is carried out employing laser beam scanning comprises the following constitutions:

a laser beam generating means to generate a laser beam;

a polygonal mirror to deflect the laser beam;

a driving means to rotate the polygonal mirror; and a braking means to decrease the speed of rotation of the polygonal mirror, wherein the braking means decreases forcibly the speed of rotation of the polygonal mirror.

DETAILED DESCRIPTION OF THE PREFERRED EMBODIMENT

The embodiment of the present invention is described below. However, the present invention is not limited to these descriptions. Furthermore, the embodiment below shows the preferred example of the present invention, which does not limit the meaning of terms nor the technical range of the present invention.

Figure 1:
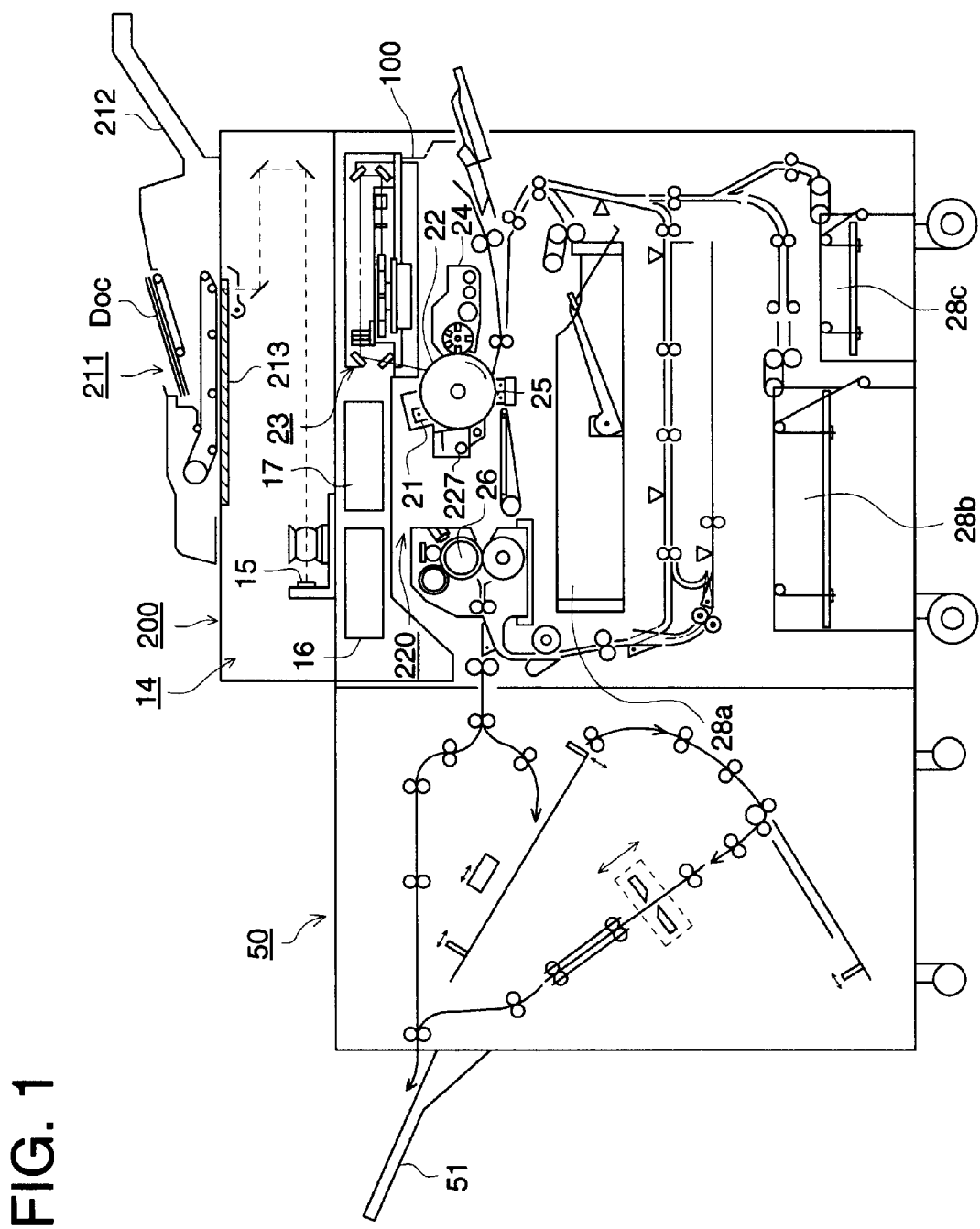
FIG. 1 is a sectional side view illustrating the entire constitution of a digital copier.

FIG. 1 is a sectional side view illustrating the entire constitution of a digital copier 200, which is one example of the image forming apparatus of the present embodiment.

A base stand 100 equipped with a laser optical system 20 (FIG. 2) which is one example of the exposure means of the present invention, upon being arranged with various optical parts is mounted in the upper part of the frame of the digital copier 200.

The digital copier 200 comprises an automatic original document feeder 211. A set of original documents Doc set in the automatic original document feeder 211 are individually separated, conveyed, and placed onto the platen glass of the digital copier 200. The image of the original document Doc is read by a scanner 14 and then ejected to an exit tray 212. Further, this automatic original document feeder 211 may, instead of ejecting the original document to the exit tray 212 as shown in the present embodiment, be of a so-called circulating type in which the original document is returned to the group of original documents or a so-called both-sided type in which the surface of the original document is reversed to the rear side.

The image of the original document Doc placed on the platen glass 213 is read by a CCD 15 employing the scanning optical system of a scanner 14 and is subjected to photoelectric conversion and unprocessed image data are obtained. The read unprocessed image data are compressed and stored in a memory 16. The compressed image data are read from the memory 16; are processed by an image processing circuit 17 and the recorded data are obtained. An image forming means 220 conducts, in accordance with the recorded data, electrophotographic processes known in the art, in which a toner image is fixed on a recording sheet and the image is formed. Namely, the read image of an original document is exposed onto a rotating photoreceptor drum 10 uniformly charged by a charging means 21 employing a laser optical system 20 (refer to FIG. 2) used as a recording optical system and an electrostatic latent image is formed. The electrostatic latent image formed on the photoreceptor 10 is developed to a toner image employing a development means 24. The formed toner image is transferred to a recording sheet conveyed from trays 28a, 28b, and 28c employing a transfer means 25. The recording sheet, to which the toner image is transferred, is fixed by a fixing means 26. On the other hand, the photoreceptor drum 10 completing the transfer of the toner image is cleaned employing a cleaning means.

The fixed recording sheet is ejected to a bookbinding device 50 connected to the main body of the digital copier 200 and is ejected to an ejecting tray 51 on the exterior of the bookbinding device 50 employing a conveyance means (not shown) in the interior of the bookbinding device 50.

Furthermore, the digital copier 200, which is the embodiment of the present invention, is constituted in such a way that the original document Doc conveyed onto the platen glass 213 employing the automatic original document feeder 211 is read by the scanner 14 and stored in a RAM 16. This RAM 16 is designed so that the information of all images of one set of original documents Doc is stored.

An operation panel is provided with operation keys such as a copy start button, a ten key, etc. which enable the operator to input desired copying conditions and a liquid crystal display. The operation panel is one example of a speed of rotation specifying means of the present invention. The digital copier 200 supports the menu name of an image forming mode termed "thick paper mode". When employing this thick paper mode, image formation is performed at the line speed suitable for the image formation on thick paper. In the digital copier 200, during continuous image formation, various menus are prepared so that the image formation on thick paper and normal paper is performed under various orders. When pushing down the copy start button, a job start signal is output and a series of copying operations are initiated. Further, the copy start button is one example of the copy operation initiating command means, and the job start signal is one example of the copy operation initiating command signals. In the present embodiment, a series of image forming operations or a series of copying operations are referred to those from generation of the copy operation initiating command signal to output of the final output image prepared by employing the image forming mode set by the operation key.

Some menu examples are shown below. For example, in the first menu, the operator places an original document on the automatic original document feeder 211 and inputs the number of copies, by employing the operation panel. When the operator depresses the copy start button, in the digital copier 200, the automatic original document feeder 211 and the scanner 14 are placed into operation and the image data of the cover and each page are stored in the memory 16. One sheet of the cover copy is then prepared employing a sheet of thick paper and after the variation in the line speed is executed, each page of the main document is copied employing normal paper and one copy of the document is bound employing the bookbinding device 50. After changing the line speed again, employing the image data of the memory 16, copies of the document are prepared up to the number of copies specified by the operator.

Furthermore, a second menu is a case, in which, in the preparation of one copy of a document consisting of a plurality of pages (n represents the number of pages), the image formation is carried out employing the thick paper mode on (5n-4) page and normal paper on the other pages. Furthermore, a plurality of copies of the document may be prepared repeating such operations a plurality of times.

Still furthermore, a third menu is an example termed an inter-sheet mode. In preparing one copy of a document consisting of a plurality of pages (in which n represents the number of pages), there is a case in which image formation is varied between the thick paper mode and normal paper for every page. In this menu example, an image on the first page of the document is copied employing normal paper and after decreasing the line speed, the same is copied employing the thick paper. The image on the second page is copied employing the normal paper and after decreasing the line speed, is copied employing the thick paper and this procedure is repeated to prepare one full set of the document. This example shows a case in which the frequency of line speed switching is maximum. If the decrease in the speed of rotation would have been waited while freely rotating the polygonal mirror, it would take an enormous time to copy a set of the document followed by the greatest decrease in productivity of image output. Thus, a menu becomes unrealistic. According to the present invention, in such a menu example, because the decrease in productivity is prevented, a realistic menu is available.

The digital copier 200 supports various menus in addition to those mentioned above.

The digital copier 200 is utilized a line speed of 370 mm/second for normal paper in A4 size and 185 mm/second for thick paper in the same size. Accordingly, the speed of rotation of the photoreceptor drum 10 and the polygonal mirror 116 are varied and controlled in accordance with these line speeds.

Figure 2:
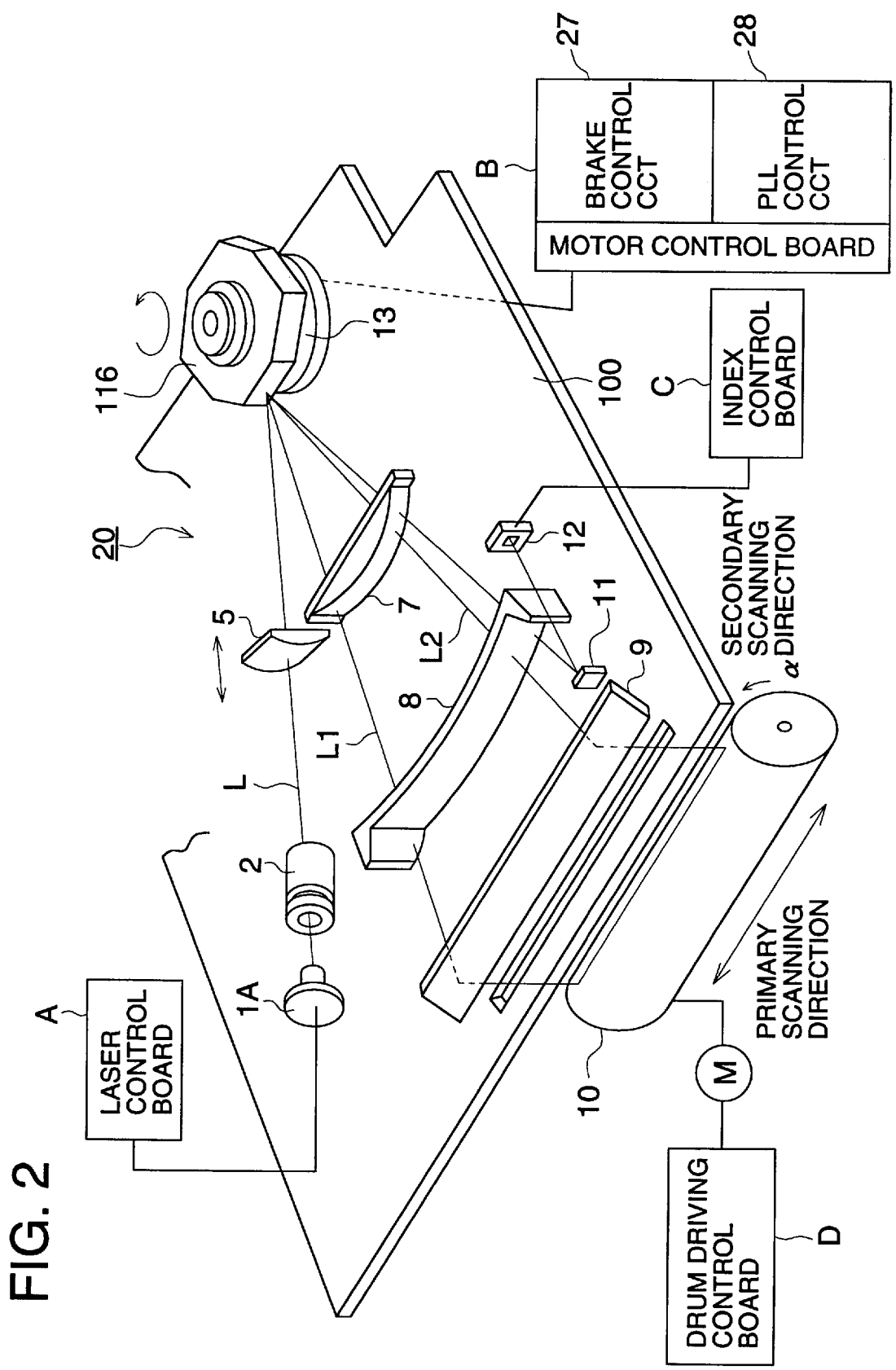
FIG. 2 is perspective view illustrating a laser optical system.

FIG. 2 is a perspective view explaining a laser optical system 20, which is an example of the exposure means of the present invention.

In FIG. 2, a laser generator 1A is a semiconductor device generating laser beams. The laser generator 1A is connected to a laser control substrate A which controls the laser generation. A collimator lens 2, a second cylindrical lens 5, a polygonal mirror 116, a fθ lens 7, a second cylindrical lens 8, and a reflection mirror 9 are a group of optical elements which adjust the beam and set the optical path. The beam generated by the laser generator 1A passes through via the optical path shown by a fine line in FIG. 2 and is focused onto the photoreceptor drum 10. The laser beam reflected on the surface of the polygonal mirror 116 executes writing while scanning in the range of the optical path L1 to L2.

The mirror 11 is a reflection mirror which leads the laser beam to a synchronization detecting device 12 which detects the initiation the time of for writing onto the photoreceptor drum 10. The synchronization detecting device 12 is connected t o an index control substrate C which controls the writing initiation time.

The laser beam emitted from the semiconductor laser generator 1A is collimated by the collimator lens 2. The collimated laser beam is incident to the polygonal mirror 116. The polygonal mirror 116 is rotated at the predetermined speed of rotation and deflects the incident laser beam. The deflected laser beam passes through the fθ lens 7 and the second cylindrical lens 8, and scans, via the reflecting mirror 9, the surface of the photoreceptor drum 10 in the sub-scanning direction employing the predetermined spot diameter. At that time, the focusing spots of each spot are termed a sub-scanning line.

The synchronization detecting device 12 detects the incident timing of the laser beam deflected by the polygonal mirror 116 via the mirror 11, and transmits the the time of pulse to the index control substrate C. In the index control substrate C, after receiving the time of pulse, the predetermined clock signals are counted, and the synchronization is carried out in such a way that count-up timing is employed as the writing initiating time for the image formation of each line.

A three-phase brushless motor 13 is a drive source to provide torque to the above-mentioned polygonal mirror 116. The three-phase brushless motor 13 is one example of the polygonal mirror drive motor of the present invention.

In a motor control substrate B, the brake control circuit 27 is a regenerative braking circuit. The brake control circuit 27 is one example of the braking means of the present invention and is explained in detail, with reference to FIG. 4 below.

In the motor control substrate B, the PLL control circuit 28 is a circuit to execute the control of the speed of rotation of the three-phase brushless motor 13 employing a phase-locked loop system. The speed of rotation of the three-phase brushless motor is provided by the frequency of the speed of rotation control signal CL (refer to FIG. 5).

The photoreceptor drum 10 is rotated by the drum drive mechanism (not shown) in the direction of the arrow marked "α". The rotational direction of the photoreceptor 1 is the same as that of the sub-operation direction. When the photoreceptor drum 10 is rotated, it is subjected to uniform charging to the predetermined electric potential employing the charging device. The portion of the surface of the photoreceptor drum 10 subjected to uniform charging is ready for the formation of the latent image, and in accordance with the rotation, is successively conveyed to the sub-scanning line of the laser beam.

A drum drive control substrate D controls the speed of rotation of a drum drive motor M and controls the speed of rotation of the photoreceptor drum 10. The peripheral speed of the surface of the photoreceptor drum 10 is matched to the conveyance speed of the recording sheet. The drum drive control substrate D changes and controls the speed of rotation of the photoreceptor drum 10 to that suitable for the image formation onto a sheet of thick paper or that suitable for the image formation onto a sheet of normal paper.

Figure 3:
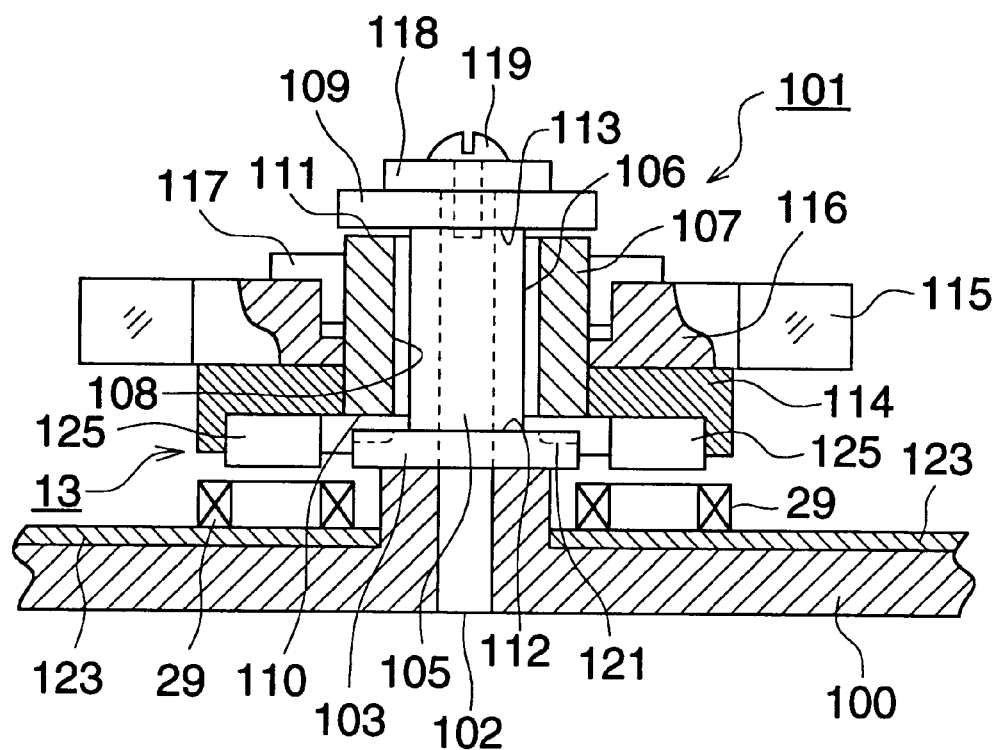
FIG. 3 is a sectional view illustrating the entire constitution of an apparatus employing an air bearing in a polygonal mirror.

FIG. 3 is a sectional view showing the entire constitution of an apparatus employing a polygonal mirror utilizing an air bearing.

On a base stand 100, one end of the center shaft 102 is vertically fixed in order to position an air bearing 101. In this center shaft 102, a plate-shaped lower thrust bearing 103 is provided. Further, the lower thrust bearing 103 may be formed in integration with a radial bearing 105. A rotor 107 has a small gap (1 to 7 μm) between a guide surface 106 of the cylinder circumference of the radial bearing 105 and a facing surface 108 formed on the inner circumference of the rotor 107, and is allowed to rotate freely. An upper thrust bearing 109 is penetrated by the center shaft 102 and fixed. A gap is formed between facing surfaces 110 and 111 formed below and above the rotor 107 and the guide surface 112 of the lower thrust bearing 103, and the guide surface 113 of the upper thrust bearing 109, respectively. On the external circumference of the rotor 107, a support part 114 formed as a separate body, is fixed; and further, the polygonal mirror 116, equipped with a number of reflecting surfaces 115, is fixed onto the support part 114, employing a fixing member 117 (the rotors and the support part 114 may be integrated). The other end of the center shaft 102 is fixed employing a support base plate 118 and screws 119.

Furthermore, a dynamic pressure generating groove 121 is formed in the guide surface 112 of the lower thrust bearing 103.

On the base stand 100, a three-phase brushless motor 13, shown in FIG. 2, is constituted in such a way that a coil 29 is provided via an insulating member 123 and in the lower part of the support part 114, a magnet 125 facing the coil 29 in the rotational direction, is provided. By energizing the coil 29, the rotor 107 is subjected to induction rotation at high speed and employed as a drive motor for the above-mentioned polygonal mirror 116. By the rotation of the above-mentioned brushless motor 13 and the dynamic pressure action resulted by the dynamic pressure generating groove 121, an air space is formed between facing surfaces 110 of the rotor, which enables smooth rotation at high speed. The air bearing 101 is constituted as mentioned above and is subjected to rotation.

In the digital copier 200, when the rotor 107 is stopped, the facing surface 110 of the above-mentioned rotor 107 and the guide surface 112 of the lower thrust bearing 103 are in contact with each other and in accordance with the rotation of the rotor 107 having the radial bearing 105 at its center, an air gap is formed between the guide surface 112 and the facing surface 110 by the dynamic pressure generating groove formed in the guide surface 112, and enables rotation at high speed. Namely, in the case of no motion, the facing surface 110 of the rotor 107 and the guide surface 112 of the lower thrust bearing 103 are generally in contact with each other due to the weight of the rotor 107. When the rotation is initiated, the air gap is formed through the floating action for the polygonal mirror 116 together with the rotor 107 and magnet 125.

Figure 4:
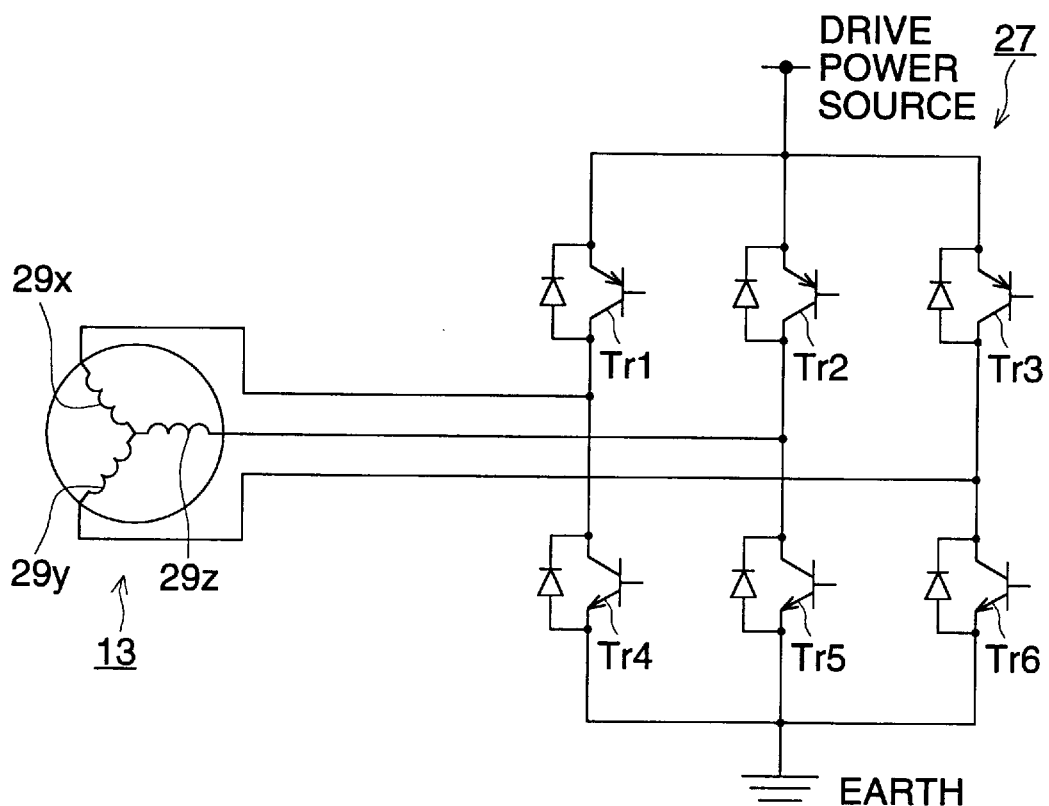
FIG. 4 is a circuit diagram showing the main parts of a brake control circuit which is one example of the control means of the present invention.

FIG. 4 is a circuit diagram showing the main parts of the brake control circuit 27, which is one example of the braking means of the present invention. Furthermore, a regenerative braking is employed as the main part of the brake control circuit 27. Further, detailed circuit constants such as bias setting, etc. are abbreviated because they are optionally chosen according to the performance, etc. of the employed motor, elements, and the brake.

The regenerative braking is known as a method in which when the drive shaft of a motor is rotated, direct braking force is applied to the drive shaft of the motor by running a counter-electromotive current, which is generated in the drive circuit supplying the electric power to the motor.

Transistors Tr 1, Tr 2, and Tr 3 are provided in the drive power source side from coils 29x, 29y, and 29z of the three-phase brushless motor 13 and carry out the switching operation. Transistors Tr 4, Tr 5, and Tr 6 are provided on the grounding side of coils 29x, 29y, and 29z of the three-phase brushless motor 13 and carry out the switching operation. Each of, the transistors 1 through 6 carries out switching operations in accordance with the voltage applied to each base.

When the three-phase brushless motor 13 herein is rotated/driven, as is well known, each of the transistors Tr 1 through Tr 6 is suitably turned on and off, and voltage is applied in a specific order such that of three coils 29x, 29y, and 29z, firstly, voltage is applied to coils 29x and 29y, secondly to coils of 29y and 29z, and thirdly to coils of 29z and 29x.

On the other hand, when the rotation of the three-phase brushless motor 13 is stopped, control is carried out in the specific order of drive stopping and the braking. The drive stop results in turning-off of entire transistors. When braking is effected, transistors Tr 1 through Tr 3 in the power side are turned on, while the transistors Tr 4 through Tr 6 in the grounding side are tuned off. Thus, counter-electromotive current flows and the rotor 107 is subjected to a braking force.

Figure 5:
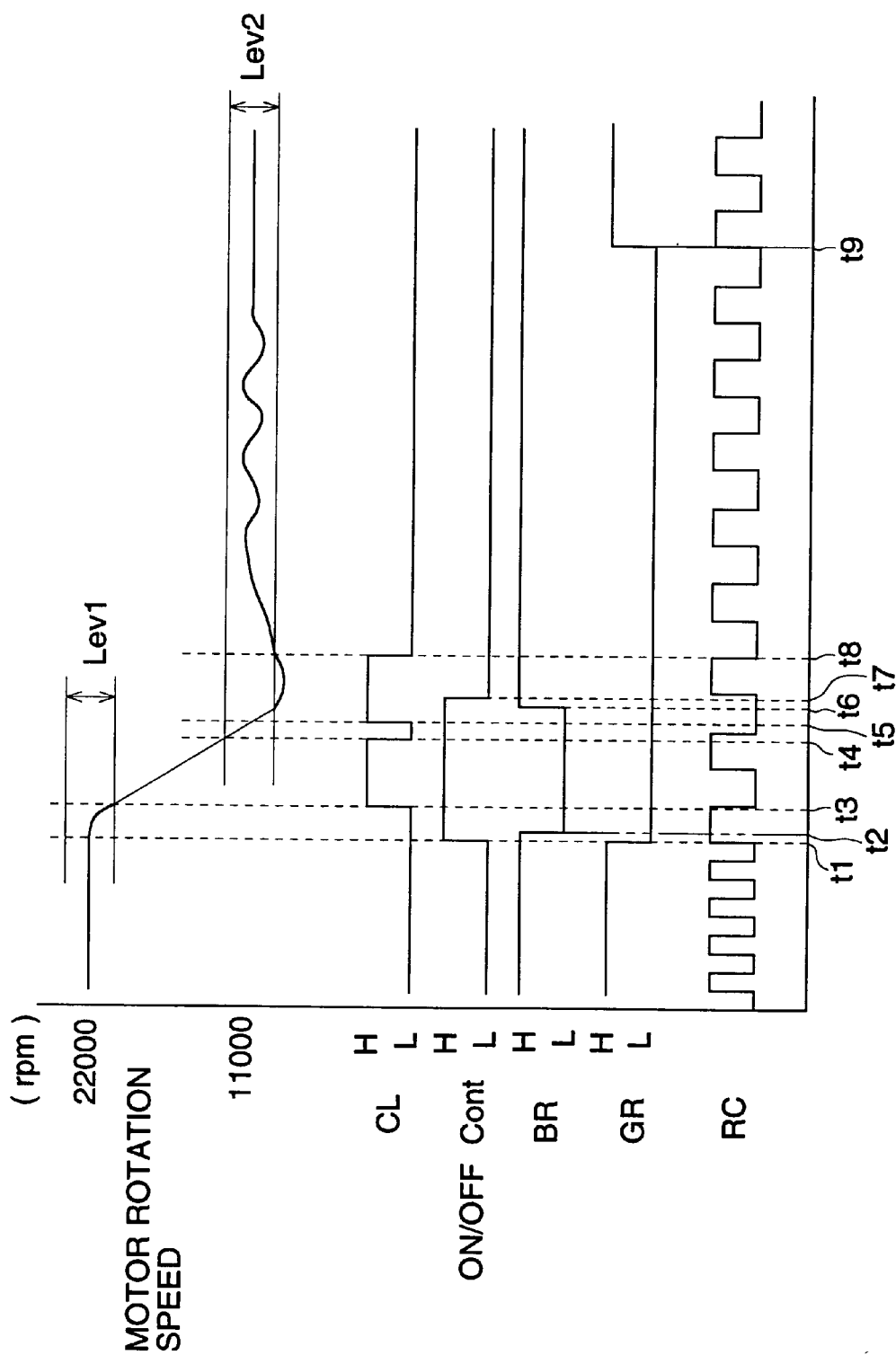
FIG. 5 is a the time of chart explaining the polygonal mirror braking operation.

FIG. 5 is a time chart explaining the polygonal mirror braking operation in the image forming apparatus in the present embodiment. The ordinate of FIG. 5 shows the speed of rotation of the three-phase brushless motor 13, control lock signal CL, motor On/Off control signal Count, brake signal BR, image forming allowing signal GR, and speed of rotation control signal RC. Each signal employs a constitution operating in negative-true logic.

The three-phase brushless motor 13 is rotated at the speed of rotation determined by the speed of rotation control signal RC; it is then controlled by the PLL control circuit 28, and is stably rotated at a speed of rotation Lev1 suitable for normal paper, or at a speed of rotation Lev2 suitable for thick paper.

When a braking force is applied, at the time of t1, the motor On/Off control signal Cont is switched to a Hi level and at the same time, the image forming allowing signal BR is switched to a Low level. When the motor On/Off control signal Cont is switched to the Hi level, all the transistors Tr 1 through Tr 6 in the brake control circuit 27 are turned off. Accordingly, the three-phase brushless motor 13 is idled. Furthermore, the central processing section of the digital copier 200 treats the polygonal mirror 116 as being in the non-operative state during the period when the image forming allowing signal GR is in the Low level. Accordingly, when the image forming allowing signal GR is the Low level, a demand for the initiation to write a latent image is refused.

Subsequently, at the time of t2, the brake signal BR is switched to the Low level. When the brake signal BR is switched to the Low level, the transistors Tr 1 through Tr 3 are turned on and the transistors Tr 4 through Tr 6 remain turned off at the time of t1. As explained, referring to FIG. 4, because the regenerative braking is operative, when the transistors Tr 1 to Tr 3 are turned on and the transistors Tr 4 to Tr 6 are turned off, the three-phase brushless motor 13 is subjected to a braking effect. When subjected to a braking effect, the rotational speed of the three-phase brushless motor 13 decreases. By the way, without first switching off the electric power supply to the three-phase brushless motor 13, when the regenerative braking is suddenly subjected to the braking force, the motor control substrate B may possibly be destroyed. Accordingly, in the digital copier 200, a constitution is employed such that for the time t1, a few clocks is delayed employing a standard clock (not shown) and the brake signal BR is then switched to the Low level.

Furthermore, at the time of t1, the frequency of the speed of rotation control signal RC is switched. The speed of rotation control signal RC is a square wave signal having a predetermined frequency. The speed of rotation of the three-phase brushless motor 13 depends on the frequency of the speed of rotation control signal RC. Namely, prior to the time of t1, the speed of rotation control signal RC, having a comparatively high frequency, is outputted and the speed of rotation of the three-phase brushless motor 13 becomes about 22,000 rpm. On the other hand, after the time of t1, the speed of rotation control signal RC having a comparatively low frequency is outputted and the speed of rotation of the three-phase brushless motor 13 becomes about 11,000 rpm.

The control lock signal CL, when the three-phase brushless motor 13 is in the range of Lev1 or Lev2, becomes the Low level. When the speed of rotation of the brushless motor 13 is out of the range of the speed of rotation Lev1 or the speed of rotation Lev2, it becomes the Hi level.

Continually, at the time of t3, the control lock signal CL is switched to the Hi level; at the time of t4, the control lock signal CL is switched to the Low level, and at the time of t5, the control lock signal CL is switched to the Hi level. When at the time of t5, the control lock signal CL is switched to the Hi level, it is found that the speed of rotation of the three-phase brushless motor 13 is decreased by the action of the regenerative braking under the lower limit of the speed of rotation Lev2. Namely, after starting braking, when the control lock signal CL rises two times, it is found that the speed of rotation of the three-phase brushless motor 13 decreases sufficiently.

At the time of t6, the brake signal BR is switched to the Hi level. When the brake signal BR is switched to the Hi level, the transistors Tr 1, 2, and 3 are turned off and braking at the regenerative braking is released and the three-phase brushless motor 13 is allowed to idle running again. Time of t6 is constituted so as to be outputted upon count completion of the counter, counting the standard clock employing the counter from the time of t1. Start the time of counting employing the counter is not limited to the time of t1 but may be at any of the times of t2 to t5.

At the time of t7, the motor On/Off control signal Cont is switched to the Low level. When the motor On/Off control signal Cont is switched to the Low level, each of transistors Tr 1 through Tr 6 repeats the switching operation which successively turns on coils 29x, 29y, and 29z of the three-phase brushless motor 13. By so doing, the three-phase brushless motor 13 is subjected to a driving force. Furthermore, the PLL control circuit 28 starts the control stabilizing the speed of rotation of the three-phase brushless motor 13 in accordance with the speed of rotation control signal RC.

At the time of t6, the control lock signal CL is switched to the Low level, the counter starts counting of the standard clock. Furthermore, at the time of t8, it is found that the three-phase brushless motor 13 which has been subjected to sufficient decrease in the speed of rotation is again subjected to an increase in the speed of rotation in the range of the speed of rotation Lev2. However, after the time of t8, the speed of rotation of the three-phase brushless motor is not stable for a while. This unstable state is gradually reduced by the action of the PLL control circuit 28.

At the time of t9, the image forming allowing signal GR is switched to the Hi level. Time of t9 is subjected to output upon completing the counting initiated at time t8. In the present embodiment, a constitution is employed in which counting is started at the time of t8. However, counting may be initiated at any of times t1 through t7.

It is constituted in such a way that a counter is provided in the motor control substrate B and the image forming allowing signal GR is transmitted from the motor control substrate B. Motor control substrate B is one example of a restart signal output means.

Figure 6:
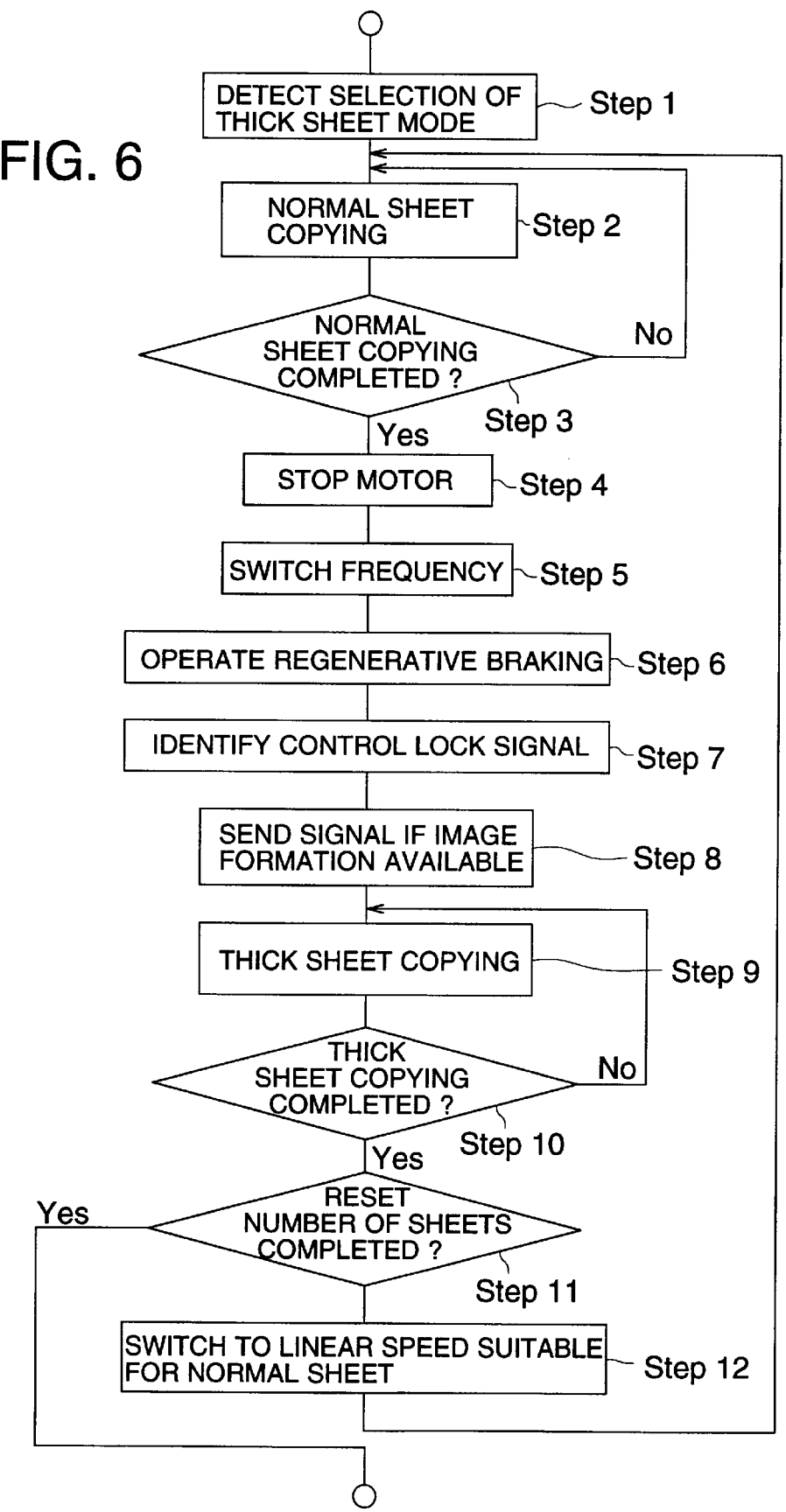
FIG. 6 is a flow chart explaining procedures of the polygonal mirror braking operation.

FIG. 6 is a flow chart explaining procedures of the polygonal mirror braking operation in the digital copier 200 in the present embodiment.

In Step 1, it is detected whether the thick paper mode has been selected, based on information which has been input on the operation panel 18 by the operator.

In Step 2, copying employing normal paper is executed.

In Step 3, is detected the completion of copying of specified number of normal paper sheets per copy.

In Step 4, the motor On/Off control signal Cont is switched to the Hi level and driving force to the tree-phase brushless motor 13 is stopped.

In Step 5, the frequency of the speed of rotation control signal RC is varied to the line speed suitable for recording thick paper.

In Step 6, the brake signal BR is switched to the Low level to operates the regenerative braking.

In Step 7, the control lock signal CL from the motor control substrate B is confirmed. As explained previously, in the present embodiment, at the time of t8 in FIG. 5, the control lock signal CL is confirmed and count is started.

In Step 8, the image forming allowing signal GR is switched to the Hi level and the receipt of image-recording command is repeated.

In Step 9, copying is executed employing thick paper sheets.

In Step 10 is detected the completion of copying of the specified number of thick paper sheets per original copy.

In Step 11 is detected the completion of copying of the number of copies of the original specified by the operator. When copying of the specified number of copies is completed, the thick paper mode ends. If copying of the specified number of copies is not finished, Step 12 follows.

In Step 12, variation of the line speed suitable for normal paper is executed.

Figure 7:
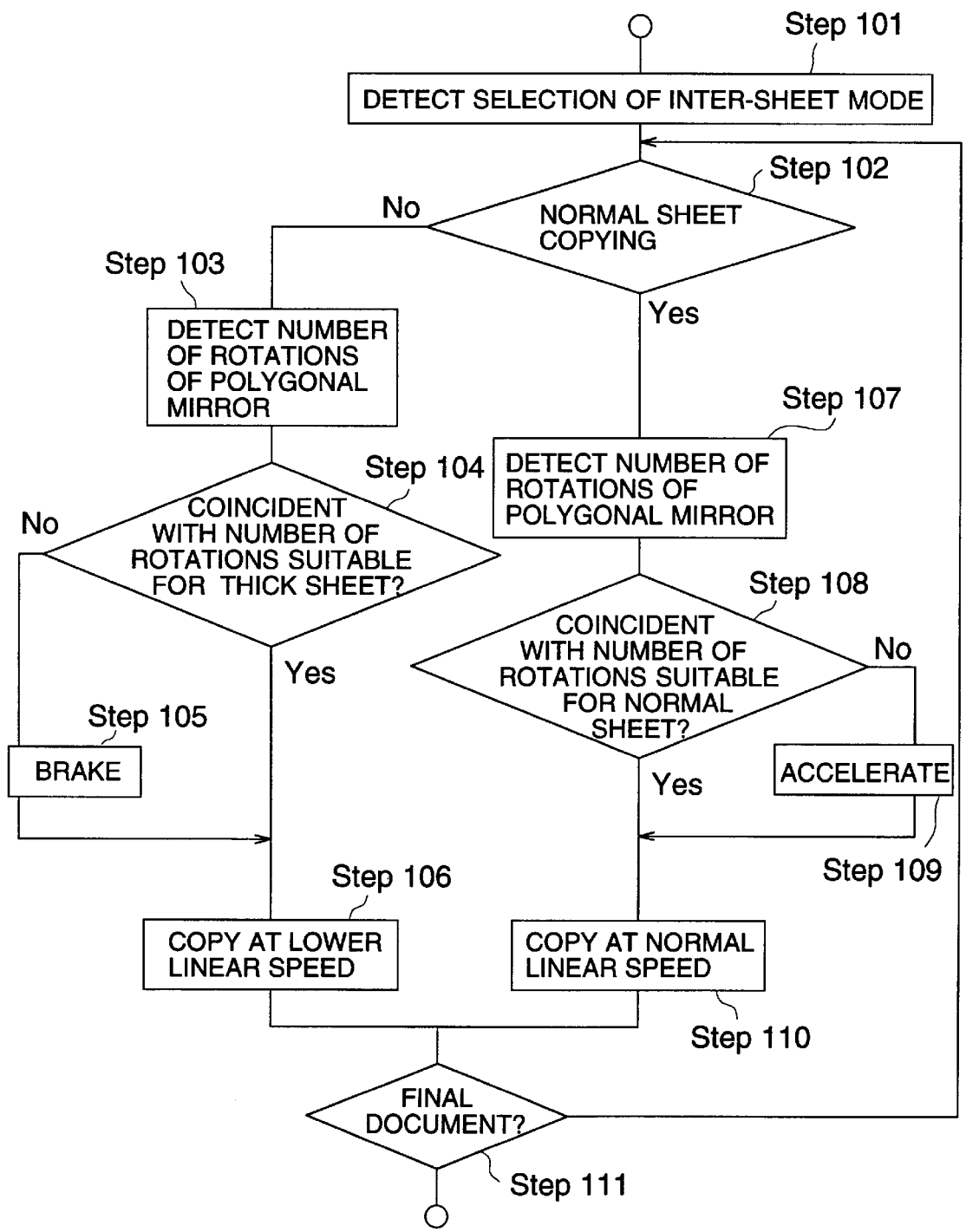
FIG. 7 is a flow chart explaining procedures of the polygonal mirror braking operation during the inter-sheet mode.

FIG. 7 is a flow chart explaining procedures of a polygonal mirror braking operation during executing the inter-sheet mode in the digital copier 200 of the present embodiment.

In Step 101 is detected the selection of the inter-sheet mode according to the information which is inputted to the panel 18 by the operator.

In Step 102, of the series of copying operations, the present single copying operation is judged to be the copying operation for normal paper. In the present embodiment, the example is explained in that the switching of the line speed, one suitable for normal paper and another one suitable for thick paper is available. Accordingly, if the "No" judgment is made in Step 102, it is found that the copying operation for thick paper should be executed.

In Step 103, the speed of rotation of the polygonal mirror 116 is detected.

In Step 104, the detected speed of rotation of the polygonal mirror 116 is judged to match to the operation frequency suitable for the image formation onto thick paper sheets. When found to be matched, copying operation may be executed employing the present speed of rotation. If not matched, because in the present example, the rotation is carried our employing the speed of rotation suitable for normal paper, the speed of rotation may be reduced.

When in Step 104, a "No" judgment is made, braking is executed in Step 105. The braking in the present Steps are those shown as one task in a series of controls of Steps 4 through 8.

In Step 106, because the digital copier 200 is operated at the line speed suitable for image formation for thick paper sheets, the copying operation is executed.

When in Step 102, the judgement is made to be "Yes", it is found that copying operation to normal paper sheets should be executed.

In Step 107, the speed of rotation of the polygonal mirror 116 is detected.

In Step 108, the decision is made whether the detected speed of rotation of the polygonal mirror 116 matches the speed of rotation suitable for image formation onto normal paper sheets. When matched, copying operation may be executed employing the present speed of rotation. In the present embodiment, when it is not matched, the rotation is carried out at the speed of rotation suitable for thick paper and therefore, the speed of rotation may be increased.

When in Step 108, the judgment is made to be "No", the rotation of the polygonal mirror 116 is accelerated in Step 109.

In Step 110, because the digital copier 200 is generally operated at a line speed suitable for the image formation onto normal paper, the copying operation is executed.

In Step 111, it is detected whether the final original document stored in the memory 16 has been outputted. When output of the final document is completed, the inter-sheet mode ends, however if it is not ended, step 102 is repeated.

In the above-mentioned embodiment, operation is explained employing the thick paper mode. However, the present invention may be applied to a digital copier which supports copying conditions necessary for switching the line speed during continuous copying.

Furthermore, a speed of rotation indicating means may be constituted in such a way that the speed of rotation is directly provided to the motor control substrate B and the drum dive control substrate D, or upon only claiming the image forming mode, the motor control substrate B and the drum drive control substrate D individually control the speed of rotation according the claim above, or without directly providing an indication signal to the motor control substrate B and the drum drive control substrate D, a signal is provided to the drum drive control substrate D via the motor control substrate B, or to the motor control substrate B via the drum drive control substrate D.

Furthermore, line speeds may be switched to three levels, that is, high speed, medium speed, and low speed. In this case, brake control from high speed to low speed, from high speed to medium speed, and from medium speed to low speed are preferably carried out selectively. For example, when the frequency of the state transition of the control lock signal CL is counted, each brake control may be executed. Further, the present invention may be applied to the case in which the variation in the line speed is specifically divided to three levels or more.

In the above-mentioned image forming apparatus, the rotation frequencies of the photoreceptor and the polygonal mirror are controlled in accordance with the inputted copy mode. When the speed of rotation is decreased, the above-mentioned polygonal mirror is subjected to braking employing the above-mentioned braking means. Thus, it becomes possible to decrease the speed of rotation of the polygonal mirror to the desired rate in a very short time. Accordingly, when the speed of rotation of a polygonal mirror during continuous imaging operation is varied, the number of output images which can be recorded per a unit of time, that is, output productivity, can be improved. Further, after a resuming signal output means inputs a resuming signal, the image formation is resumed. Thus, even though braking is carried out over a short time, defective images are not outputted due to unstable speed of rotation.

As the above-mentioned braking means. a regenerative braking is employed. Accordingly, the rotation of the polygonal mirror is subjected to braking employing electromagnetic force without contacting the polygonal mirror and rotation shaft. Thus, it becomes possible to almost eliminate the possibility in which foreign matter is adhered to the polygonal mirror during the braking operation.

Further, it is recommended to apply the above-mentioned rotation shaft to the image forming apparatus supported by an air bearing. When the polygonal mirror is supported by an air bearing, the bearing is subjected to low friction. Accordingly, a very long time is required for a decrease in the speed of rotation to be effected while the polygonal mirror rotates freely. On the other hand, in the image forming apparatus in which the air bearing is employed, when the speed of rotation is to be decreased, the time for the effect may be shortened by applying braking, employing a braking means.

What is claimed is:

1. An image forming apparatus in which an exposure is conducted by scanning of a laser beam, said apparatus comprising:

(a) a photoreceptor for carrying a latent image thereon;
    (b) exposure means having a rotary polygonal mirror for exposing said photoreceptor to form the latent image thereon, wherein the laser beam is deflected and scanned onto said photoreceptor by rotating the rotary polygonal mirror;
    (c) control means for controlling a linear speed of said photoreceptor; and
    (d) braking means for decreasing forcibly a speed of rotation of the polygonal mirror,
    wherein when said control means decreases the linear speed of said photoreceptor according to an image formation mode, said braking means decreases the speed of rotation of the polygonal mirror.

2. The image forming apparatus of claim 1, wherein said braking means decreases the speed of rotation of the polygonal mirror without being in contact with the polygonal mirror.

3. The image forming apparatus of claim 2, wherein said braking means comprises a regenerative braking circuit for decreasing the speed of rotation of the polygonal mirror.

4. The image forming apparatus of claim 3, further comprising:

a drive motor for driving the polygonal mirror to rotate; and
    a driver circuit for supplying an electric power to said drive motor,
    wherein when said braking means decreases the speed of rotation of the polygonal mirror, said driver circuit stops supplying the electric power to said drive motor, said regenerative braking circuit operates after said driver circuit stops supplying the electric power to said drive motor, and said driver circuit restarts supplying the electric power to said drive motor after operation of said regenerative braking circuit is released.

5. The image forming apparatus of claim 1, wherein the polygonal mirror is supported by an air bearing.

6. The image forming apparatus of claim 1, further comprising:

developing means for developing the latent image on said photoreceptor to form a toner image; and
    recording means for recording the toner image onto a recording sheet,
    wherein when the recording sheet is thick, said braking means decreases the speed of rotation of the polygonal mirror.

7. The image forming apparatus of claim 1, wherein said braking means decreases a number of rotations of the polygonal mirror during an image forming operation.

8. The image forming apparatus of claim 1, further comprising:
   developing means for developing the latent image on said photoreceptor to form a toner image; and
   recording means for recording the toner image onto a recording sheet,
   wherein when the image formation mode is a mode in which an image is successively recorded onto a first sheet of a first material and a second sheet of a second material both provided in said apparatus, said braking means decreases the speed of rotation of the polygonal mirror.

9. The image forming apparatus of claim 8, wherein the first sheet is a normal sheet, and the second sheet is a thick sheet.

10. The image forming apparatus of claim 1, further comprising:
   developing means for developing the latent image on said photoreceptor to form a toner image; and
   recording means for recording the toner image onto a recording sheet,
   wherein said braking means decreases the speed of rotation of the polygonal mirror when a type of the recording sheet is changed.

11. The image forming apparatus of claim 1, further comprising detecting means for detecting a rotation state of the polygonal mirror,
   wherein after said braking means forcibly applies a load to the polygonal mirror, an image formation operation can be carried out if the rotation of the polygonal mirror is detected to be stable.

* * * * *